(12) United States Patent
Tanaka (10) Patent No.: US 9,121,974 B2
(45) Date of Patent: Sep. 1, 2015

(54) LIGHT GUIDE, ILLUMINATING DEVICE, AND IMAGE READING APPARATUS

(71) Applicant: KONICA MINOLTA, INC., Chiyoda-ku (JP)

(72) Inventor: Masahiko Tanaka, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 64 days.

(21) Appl. No.: 13/942,302

(22) Filed: Jul. 15, 2013

(65) Prior Publication Data
US 2014/0029256 A1    Jan. 30, 2014

(30) Foreign Application Priority Data

Jul. 26, 2012   (JP) .................................. 2012-166141

(51) Int. Cl.
*F21V 8/00*    (2006.01)
(52) U.S. Cl.
CPC .............. *G02B 6/0001* (2013.01); *G02B 6/001* (2013.01); *G02B 6/0045* (2013.01)
(58) Field of Classification Search
None
See application file for complete search history.

(56) References Cited

U.S. PATENT DOCUMENTS

| 4,280,751 | A | * | 7/1981 | DiVita | ............................. | 385/45 |
| 6,351,594 | B1 | | 2/2002 | Nakamura et al. | | |
| 2001/0035986 | A1 | | 11/2001 | Ikeda | | |
| 2009/0003784 | A1 | | 1/2009 | Kabuki et al. | | |

FOREIGN PATENT DOCUMENTS

| JP | 11-134918 A | 5/1999 |
| JP | 2001-159796 A | 6/2001 |
| JP | 2005-229647 A | 8/2005 |
| JP | 2008-216409 A | 9/2008 |
| JP | 2009-225414 A | 10/2009 |
| JP | 2010-045755 A | 2/2010 |

OTHER PUBLICATIONS

Office Action (Notification of Reasons for Rejection) issued on Nov. 25, 2014, by the Japan Patent Office in corresponding Japanese Patent Application No. 2012-166141, and an English Translation of the Office Action (8 pages).

* cited by examiner

*Primary Examiner* — Britt D Hanley
(74) *Attorney, Agent, or Firm* — Buchanan Ingersoll & Rooney (57) ABSTRACT

A light guide with a bar-like shape that extends in a predetermined direction, having: a reflective surface that reflects light inside the light guide within the light guide; a first output surface that causes light inside the light guide to exit the light guide, the first output surface, when viewed in plan from the predetermined direction, constituting a first arc of an ellipse that has a first focal point, along with a second focal point located on the reflective surface, and the first arc being closer to the first focal point than to the second focal point; and a second output surface that causes light inside the light guide to exit the light guide, the second output surface, when viewed in plan from the predetermined direction, constituting a second arc of an ellipse that has a third focal point, along with a fourth focal point coinciding with the second focal point, and the second arc being closer to the third focal point than to the fourth focal point.

12 Claims, 6 Drawing Sheets

PRIOR ART

LIGHT GUIDE, ILLUMINATING DEVICE, AND IMAGE READING APPARATUS

This application is based on Japanese Patent Application No. 2012-166141 filed on Jul. 26, 2012, the content of which is incorporated herein by reference.

BACKGROUND OF THE INVENTION

1. Field of the Invention

The present invention relates to light guides, illuminating devices, and image reading apparatuses, more particularly to a light guide and an illuminating device for use in an image reading apparatus.

2. Description of Related Art

Figure 10:
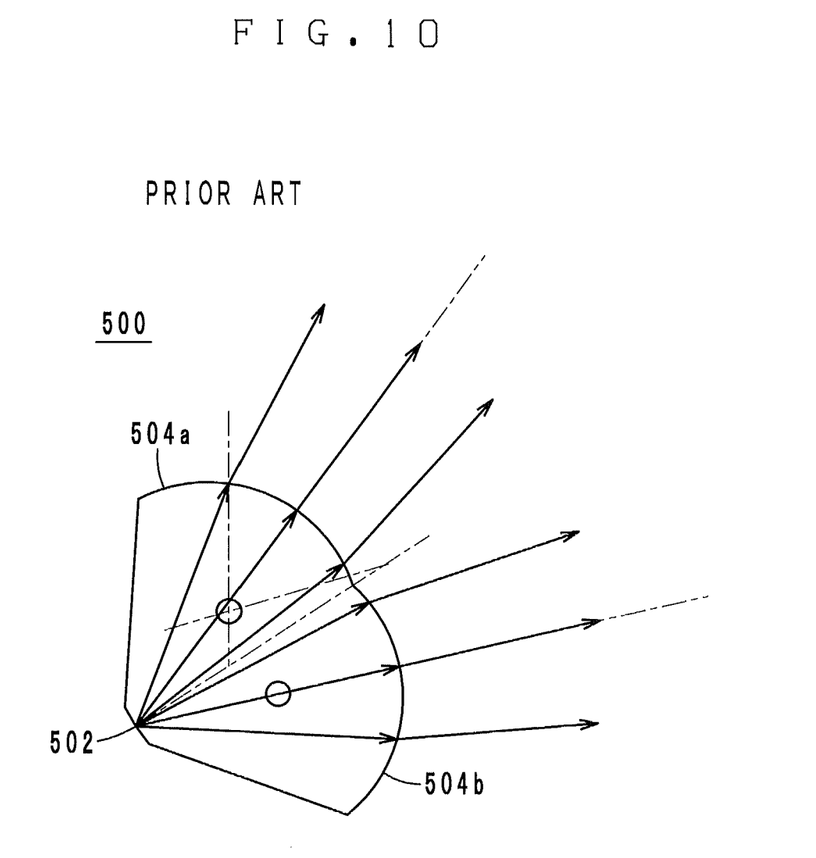
FIG. 10 is a cross-sectional structure diagram of a light guide described in Japanese Patent Laid-Open Publication No. 2008-216409.

For example, a known conventional light guide is described in Japanese Patent Laid-Open Publication No. 2008-216409. FIG. 10 is a cross-sectional structure diagram of a light guide 500 described in Japanese Patent Laid-Open Publication No. 2008-216409.

The light guide 500 includes a reflective surface 502 and output surfaces 504a and 504b, as shown in FIG. 10. The output surfaces 504a and 504b are in the form of arcs next to each other. Moreover, the reflective surface 502 is provided in a position facing the output surfaces 504a and 504b. Light reflected by the reflective surface 502 is collimated by the output surface 504a or 504b upon exit from the light guide 500.

Incidentally, there is some demand for light to be utilized more efficiently in a light guide.

SUMMARY OF THE INVENTION

In a first embodiment of the present invention, a light guide having a bar-like shape that extends in a predetermined direction includes: a reflective surface that reflects light inside the light guide within the light guide; a first output surface that causes light inside the light guide to exit the light guide, the first output surface, when viewed in plan from the predetermined direction, constituting a first arc of an ellipse that has a first focal point, along with a second focal point located on the reflective surface, and the first arc being closer to the first focal point than to the second focal point; and a second output surface that causes light inside the light guide to exit the light guide, the second output surface, when viewed in plan from the predetermined direction, constituting a second arc of an ellipse that has a third focal point, along with a fourth focal point coinciding with the second focal point, and the second arc is closer to the third focal point than to the fourth focal point.

In a second embodiment of the present invention, an illuminating device includes a light guide of the first embodiment in which the light guide has a first end face and a second end face at opposite ends in the predetermined direction, the first light source emits light so as to enter the light guide from the third focal point on the first end face or from the third focal point on the second end face, and the second light source emits light so as to enter the light guide from the first focal point on the first end face or from the first focal point on the second end face. The illuminating device also includes a first light source that emits light so as to enter the light guide from the third focal point on the first end face or the third focal point on the second end face, and a second light source that emits light so as to enter the light guide from the first focal point on the first end face or the first focal point on the second end face.

In a third embodiment of the present invention, an image reading apparatus includes an illuminating device of the second embodiment.

In a fourth embodiment of the present invention, an image reading apparatus includes an illuminating device of the third embodiment.

DETAILED DESCRIPTION OF THE PREFERRED EMBODIMENTS

Hereinafter, an image reading apparatus including a light guide and an illuminating device according to an embodiment of the present invention will be described.

Configuration of Image Reading Apparatus

Figure 1:
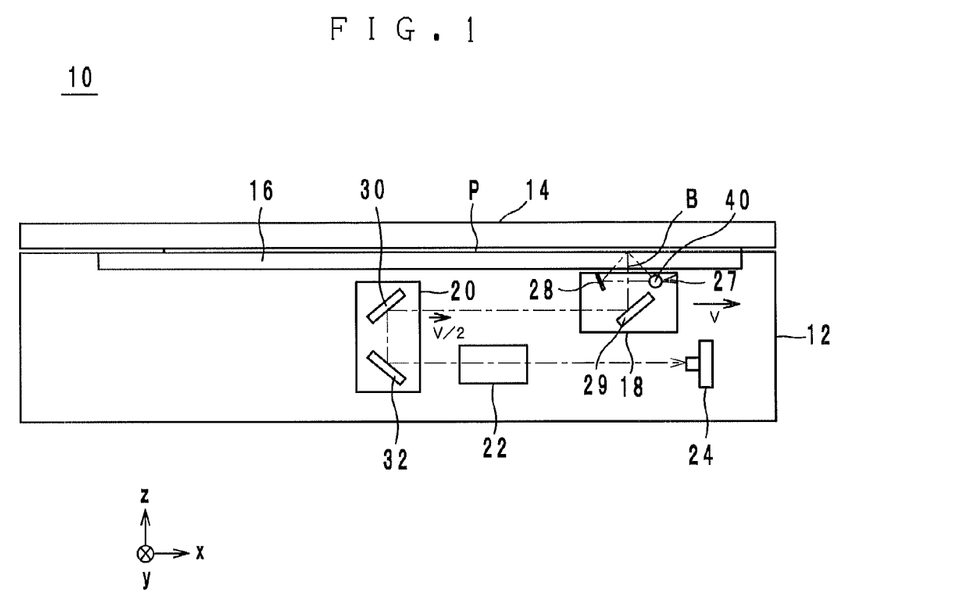
FIG. 1 is a configuration diagram of an image reading apparatus including a light guide and an illuminating device according to an embodiment of the present invention.

FIG. 1 is a configuration diagram of an image reading apparatus 10 including a light guide and an illuminating device according to an embodiment of the present invention. In the following, the vertical direction will be defined as z-axis, and the moving direction of slider units 18 and 20 (i.e., a sub-scanning direction) will be defined as x-axis. Moreover, the direction that is perpendicular to the x- and z-axes (i.e., a main scanning direction) will be defined as y-axis.

The image reading apparatus 10 includes a main housing 12, a document cover 14, a platen glass 16, the slider units 18 and 20, an imaging lens 22, and an image pickup element 24, as shown in FIG. 1.

The main housing 12 is a rectangular parallelepiped casing in which the document cover 14, the platen glass 16, the slider units 18 and 20, the imaging lens 22, and the image pickup element 24 are provided. The platen glass 16 is a rectangular, transparent plate attached to an opening provided in the main housing 12 in the positive z-axis direction. A document P is placed on the top surface of the platen glass 16, with the face to be read being directed to the negative z-axis direction.

The document cover 14 is placed over the document P, thereby causing the document P to closely contact the platen glass 16, as shown in FIG. 1.

When the document P is being read, the slider unit 18 is moved at a velocity V along the document P in the positive x-axis direction by unillustrated transportation means, including a motor, a belt, a pulley, etc., as shown in FIG. 1. The slider unit 18 includes an illuminating device 27, and mirrors 28 and 29, as shown in FIG. 1.

The illuminating device 27 is configured by, for example, a combination of a light-emitting diode (LED) and a light guide, so as to emit light toward the document P and the mirror 28. The illuminating device 27 will be described in more detail later. The mirror 28 reflects the light emitted by the illuminating device 27, toward the document P. The mirror 29 reflects light B reflected by the document P, in the negative x-axis direction (toward one side of the sliding direction of the slider unit 18), as shown in FIG. 1.

When the document P is being read, the slider unit 20 is moved at a velocity V/2 along the document P in the positive x-axis direction by unillustrated transportation means, including a motor, a belt, a pulley, etc., as shown in FIG. 1. The slider unit 20 includes mirrors 30 and 32.

The mirror 30 reflects the light B reflected by the mirror 29, in the negative z-axis direction. The mirror 32 reflects the light B reflected by the mirror 30, in the positive x-axis direction.

The imaging lens 22 forms an optical image on the image pickup element 24 on the basis of the light B. The image pickup element 24 is a light receiving element that receives light B reflected by the mirror 32. Specifically, the image pickup element 24 is a line sensor, such as a CCD camera, which has a linear imaging zone extending in the y-axis direction and reads an image of the document P by scanning the optical image formed by the imaging lens 22.

Configuration of Illuminating Device

Figure 2:
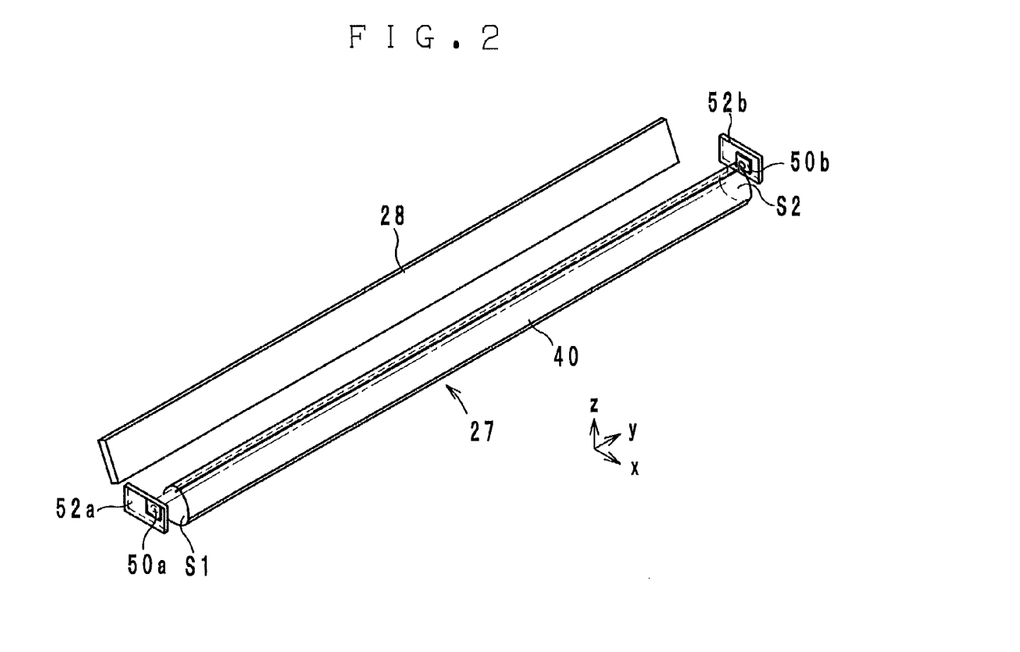
FIG. 2 is an oblique external view of the illuminating device and a mirror.
Figure 3:
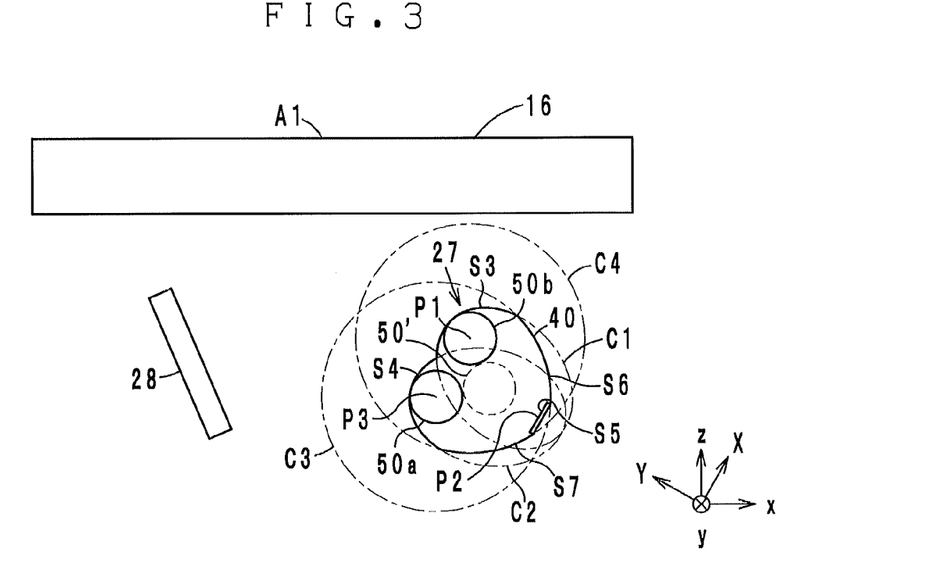
FIG. 3 is a diagram illustrating the illuminating device as viewed in plan from the negative y-axis direction.

The configuration of the illuminating device 27 will be described below with reference to the drawings. FIG. 2 is an oblique external view of the illuminating device 27 and the mirror 28. FIG. 3 is a diagram illustrating the illuminating device 27 as viewed in plan from the negative y-axis direction.

The illuminating device 27 includes a light guide 40, light sources 50a and 50b, and circuit boards 52a and 52b, as shown in FIGS. 2 and 3.

The light guide 40 is a bar-like member made of transparent resin (polymethyl methacrylate resin) and extending in the y-axis direction (predetermined direction) as shown in FIGS. 2 and 3. The light guide 40 includes end faces S1 and S2, output surfaces S3 and S4, a reflective surface S5, and arched surfaces S6 and S7.

The end face S1 is a surface positioned at the end of the light guide 40 in the negative y-axis direction, as shown in FIG. 2. The end face S2 is a surface positioned at the end of the light guide 40 in the positive y-axis direction. The end faces S1 and S2 are heart-shaped.

The output surfaces S3 and S4, the reflective surface S5, and the arched surfaces S6 and S7 are side faces of the light guide 40, and extend in the y-axis direction. The reflective surface S5, when viewed in plan from the negative y-axis direction, is a plane that is normal to a reading position A1 on the platen glass 16, as shown in FIG. 3, and reflects light inside the light guide 40 within the light guide 40. For example, the reflective surface S5 is formed by a plurality of prisms arranged in the y-axis direction. Note that the reflective surface S5 is not limited to the prisms, and may be a white resin surface for diffuse reflection.

The output surface S3, when viewed in plan from the negative y-axis direction, forms an elliptical arc that partially constitutes an ellipse C1 with focal points P1 and P2, as shown in FIG. 3, and the output surface S3 causes light inside the light guide 40 to exit the light guide 40. More specifically, the focal point P1 is positioned in the negative x-axis direction from the focal point P2 and also in the positive z-axis direction therefrom. Moreover, the focal point P2, when viewed in plan from the negative y-axis direction, is positioned at the center of the reflective surface S5. In addition, the output surface S3 is positioned closer to the focal point P1 than to the focal point P2, and is convex both in the negative x-axis direction and in the positive z-axis direction.

The output surface S4, when viewed in plan from the negative y-axis direction, forms an elliptical arc that partially constitutes an ellipse C2 with focal points P2 and P3, as shown in FIG. 3, and the output surface S4 causes light inside the light guide 40 to exit the light guide 40. More specifically, the focal point P3 is positioned in the negative x-axis direction from the focal point P2 and also in the positive z-axis direction therefrom. In addition, the focal point P2 is positioned in the positive x-axis direction from the focal point P1 and also in the negative z-axis direction therefrom. Further, a line extending between the focal points P1 and P3 is parallel to the reflective surface S5. Still further, the focal point P2 in the ellipse C2 coincides with the focal point P2 in the ellipse C1. Yet further, the distance between the focal point P2 and the focal point P1 is equal to the distance between the focal point P2 and the focal point P3. Accordingly, the ellipse C2 is an ellipse that has the same shape as the ellipse C1 and can be obtained by rotating the ellipse C1 counterclockwise about the focal point P2. Moreover, the output surface S4 is positioned closer to the focal point P3 than to the focal point P2, and is convex both in the negative x-axis direction and in the positive z-axis direction.

The arched surface S6, when viewed in plan from the negative y-axis direction, forms a circular arc that partially constitutes a circle C3 with the focal point P3 at the center, as shown in FIG. 3, and the arched surface S6 connects the output surface S3 and the reflective surface S5. The arched surface S6 causes light inside the light guide 40 to experience total reflection within the light guide 40. The arched surface S7, when viewed in plan from the negative y-axis direction, forms a circular arc that partially constitutes a circle C4 with the focal point P1 at the center, and the arched surface S7 connects the output surface S4 and the reflective surface S5. The arched surface S7 causes light inside the light guide 40 to experience total reflection within the light guide 40.

The circuit board 52a is a flat rectangular board provided with a driver circuit for driving the light source 50a, as shown in FIG. 2. The circuit board 52a is perpendicular to the y-axis, and faces the end face S1.

The light source 50a is a point source formed by, for example, an LED, and is mounted on a principal surface of the circuit board 52a in the positive y-axis direction. The light source 50a, when viewed in plan from the negative y-axis direction, overlaps with the focal point P3, as shown in FIG. 3, and causes light to enter the light guide 40 via the focal point P3 on the end face S1.

The circuit board 52b is a flat rectangular board provided with a driver circuit for driving the light source 50b, as shown in FIG. 2. The circuit board 52b is perpendicular to the y-axis, and faces the end face S2.

The light source 50b is a point source formed by, for example, an LED, and is mounted on a principal surface of the circuit board 52b in the negative y-axis direction. The light source 50b, when viewed in plan from the negative y-axis direction, overlaps with the focal point P1, as shown in FIG. 3, and causes light to enter the light guide 40 via the focal point P1 on the end face S2.

Figure 4:
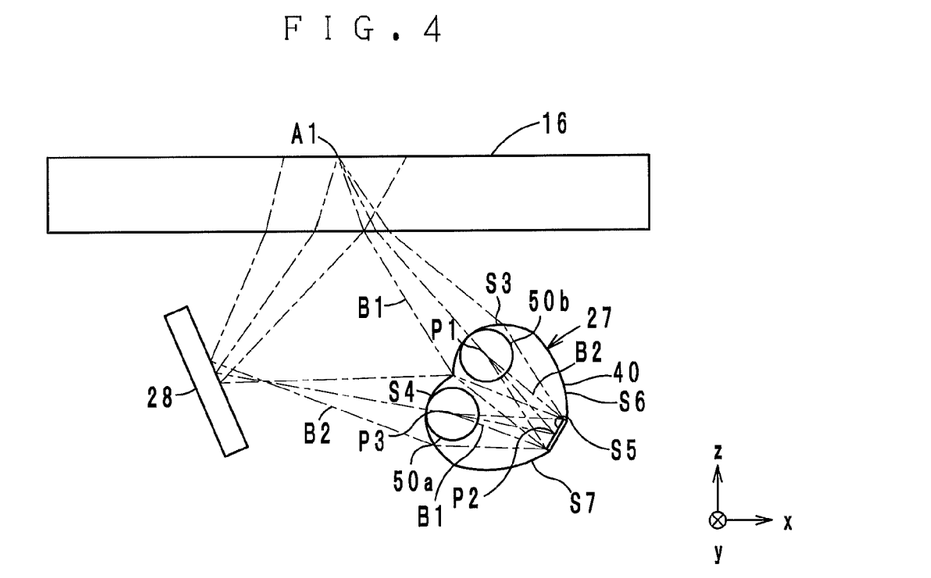
FIG. 4 is a diagram showing optical paths in the light guide.
Figure 5:
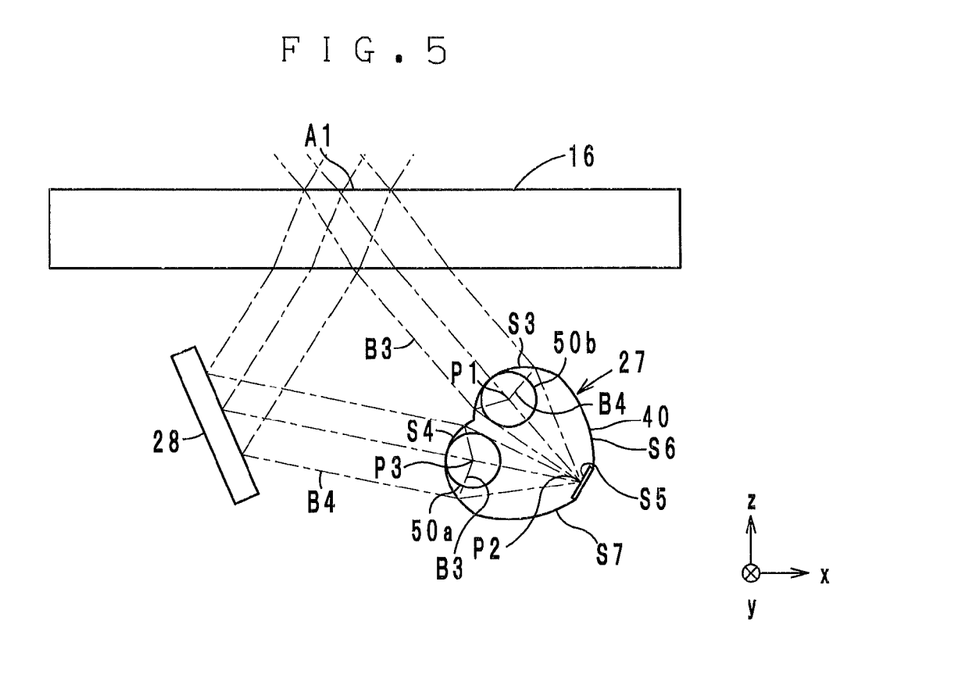
FIG. 5 is another diagram showing optical paths in the light guide.
Figure 6:
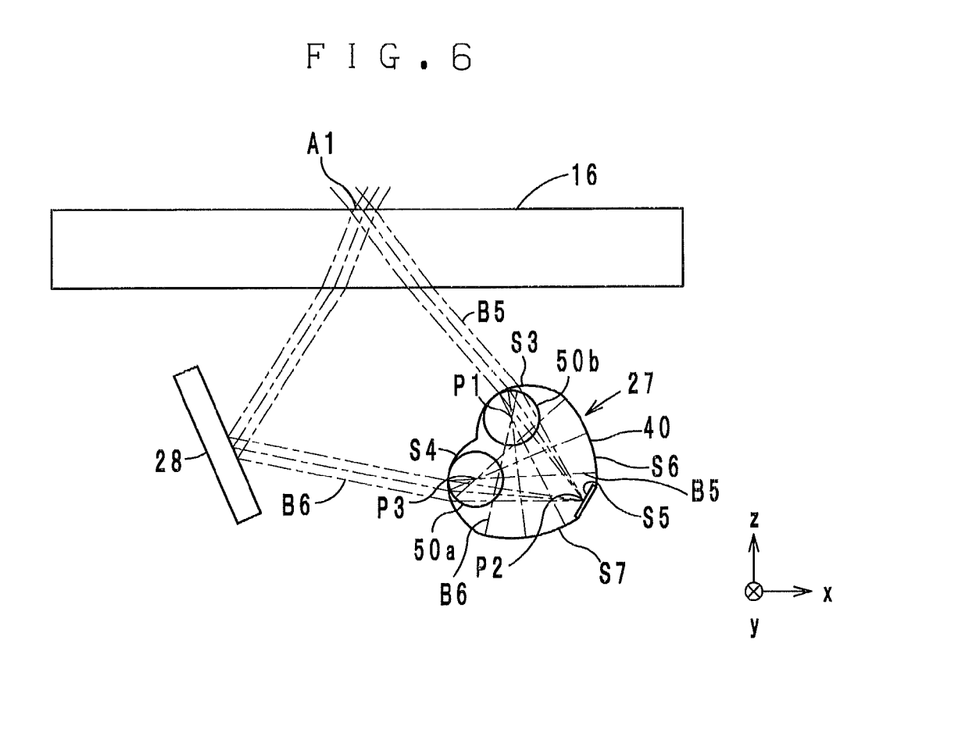
FIG. 6 is still another diagram showing optical paths in the light guide.

Optical paths of the illuminating device 27 will be described in detail below with reference to FIGS. 4 through 6. FIGS. 4 through 6 are diagrams illustrating optical paths in the light guide 40. Note that the optical path viewed in plan from the negative y-axis direction will be described below, where light emitted by the light source 50a travels in the positive y-axis direction while repeatedly experiencing total reflection, and light emitted by the light source 50b travels in the negative y-axis direction while repeatedly experiencing total reflection.

A portion of the light that has entered the light guide 40 from the focal point P3 on the end face S1 travels directly toward the reflective surface S5, as shown in FIG. 4, and this portion will be defined as light B1. The light B1 is reflected by the reflective surface S5. Here, the reflective surface S5, when viewed in plan from the negative y-axis direction, is parallel to a line extending between the focal points P1 and P3. Accordingly, the light B1 reflected by the reflective surface S5 travels toward the focal point P1, and exits the light guide 40 through the output surface S3. The light B1 travels toward the reading position A1 on the platen glass 16, as shown in FIG. 4, and is converged at the reading position A1 by the output surface S3.

Furthermore, a portion of the light that has entered the light guide 40 from the focal point P1 on the end face S2 travels directly toward the reflective surface S5, and this portion will be defined as light B2. The light B2 is reflected by the reflective surface S5. Here, the reflective surface S5, when viewed in plan from the negative y-axis direction, is parallel to the line extending between the focal points P1 and P3. Accordingly, the light B2 reflected by the reflective surface S5 travels toward the focal point P3, and exits the light guide 40 through the output surface S4. The light B2 travels toward the mirror 28, and is converged in front of the mirror 28 by the output surface S4, as shown in FIG. 4. Moreover, the light B2 is reflected by the mirror 28 toward the reading position A1 on the platen glass 16. The light B2 is diffused after it is converged in front of the mirror 28. Thus, the light B2 illuminates the platen glass 16 in the vicinity of the reading position A1.

A portion of the light that has entered the light guide 40 from the focal point P3 on the end face S1 travels directly toward the output surface S4, as shown in FIG. 5, and this portion will be defined as light B3. The light B3 having entered from the focal point P3 experiences total reflection by the output surface S4, which partially constitutes the ellipse C2 having the focal point P3. As a result, the light B3 is converged at the focal point P2 in the ellipse C2 after it experiences total reflection by the output surface S4. The light B3 is then reflected by the reflective surface S5. Here, the reflective surface S5, when viewed in plan from the negative y-axis direction, is parallel to the line extending between the focal points P1 and P3. Accordingly, the light B3 reflected by the reflective surface S5 travels toward the focal point P1, and exits the light guide 40 through the output surface S3. At this time, the light B3 is approximately collimated by the output surface S3. The light B3 travels toward the reading position A1 on the platen glass 16, as shown in FIG. 5, and illuminates the platen glass 16 at the reading position A1.

Furthermore, a portion of the light that has entered the light guide 40 from the focal point P1 on the end face S2 travels directly toward the output surface S3, and this portion will be defined as light B4. The light B4 having entered from the focal point P1 experiences total reflection by the output surface S3, which partially constitutes the ellipse C1 having the focal point P1. As a result, the light B4 is converged at the focal point P2 by the ellipse C1 after it experiences total reflection by the output surface S3. The light B4 is then reflected by the reflective surface S5. Here, the reflective surface S5, when viewed in plan from the negative y-axis direction, is parallel to the line extending between the focal points P1 and P3. Accordingly, the light B4 reflected by the reflective surface S5 travels toward the focal point P3, and exits the light guide 40 through the output surface S4. At this time, the light B4 is approximately collimated by the output surface S4. Furthermore, the light B4 is reflected by the mirror 28 so as to travel toward the reading position A1 on the platen glass 16 and thereby illuminate the platen glass 16 at the reading position A1.

A portion of the light that has entered the light guide 40 from the focal point P3 on the end face S1 travels directly toward the arched surface S6, as shown in FIG. 6, and this portion will be defined as light B5. The light B5 experiences total reflection by the arched surface 56. Since the focal point P3 is at the center of the circle partially constituted by the arched surface S6, the light B5 having experienced total reflection by the arched surface S6 is converged at the focal point P3, and thereafter experiences total reflection by the output surface S4, which partially constitutes the ellipse C2 having the focal point P3. The light B5 having experienced total reflection by the output surface S4 is converged at the focal point P2 in the ellipse C2. Thereafter, the light B5 is reflected by the reflective surface S5. Here, the reflective surface S5, when viewed in plan from the negative y-axis direction, is parallel to the line extending between the focal points P1 and P3. Accordingly, the light B5 reflected by the reflective surface S5 travels toward the focal point P1, and exits the light guide 40 through the output surface S3. At this time, the light B5 is approximately collimated by the output surface S3. The light B5 travels toward the reading position A1 on the platen glass 16, as shown in FIG. 6, and illuminates the platen glass 16 at the reading position A1.

Furthermore, a portion of the light that has entered the light guide 40 from the focal point P1 on the end face S2 travels directly toward the arched surface S7, and this portion will be defined as light B6. The light B6 experiences total reflection by the arched surface S7. Since the focal point P1 is at the center of the circle partially constituted by the arched surface S7, the light B6 having experienced total reflection by the arched surface S7 is converged at the focal point P1, and thereafter experiences total reflection by the output surface S3, which partially constitutes the ellipse C1 having the focal point P1. The light B6 reflected by the output surface S3 is converged at the focal point P2 in the ellipse C1. Thereafter, the light B6 is reflected by the reflective surface S5. Here, the reflective surface S5, when viewed in plan from the negative y-axis direction, is parallel to the line extending between the focal points P1 and P3. The light B6 reflected by the reflective surface S5 travels toward the focal point P3, and exits the light guide 40 through the output surface S4. At this time, the light B6 is approximately collimated by the output surface S4. Further, the light B6 is reflected by the mirror 28 so as to travel toward the reading position A1 on the platen glass 16 and thereby illuminate the platen glass 16 at the reading position A1.

Effects

The light guide 40 according to the present embodiment makes it possible to enhance light use efficiency. More specifically, the output surface S4 of the light guide 40, when viewed in plan from the negative y-axis direction, is an elliptical arc which partially constitutes an ellipse including the focal point P3, along with the focal point P2 on the reflective surface S5, and the elliptical arc is positioned closer to the focal point P3 than to the focal point P2. Therefore, the light B3 is converged at the focal point P2 of the output surface S4 after experiencing total reflection by the output surface S4, as shown in FIG. 5. Thereafter, the light B3 is reflected by the reflective surface S5 so as to exit the light guide 40 through the output surface S3 and travel toward the reading position A1. In this manner, in the light guide 40, the light B3, which is a portion of the light that has entered the light guide 40 from the focal point P3 on the end face S1, travels directly toward the output surface S4 and then travels toward the reading position A1. Moreover, in the light guide 40, for the same reason, the light B4, which is a portion of the light that has entered the light guide 40 from the focal point P1 on the end face S2, travels directly toward the output surface S4, and thereafter travels toward the reading position A1. Thus, the light guide 40 makes it possible to enhance light use efficiency.

Furthermore, for the following reason also, the light guide 40 can enhance light use efficiency. More specifically, the arched surface S6 of the light guide 40, when viewed in plan from the negative y-axis direction, partially constitutes a circle with the focal point P3 at the center and connects the output surface S3 and the reflective surface S5. Therefore, once the light B5 experiences total reflection by the arched surface S6, it is converged at the focal point P3, which is at the center of the circle partially constituted by the arched surface S6, and thereafter experiences total reflection by the output surface S4, which partially constitutes the ellipse C2 and corresponds to the focal point P3, as shown in FIG. 6. The light B5 is converged at the focal point P2 in the ellipse C2 after the total reflection by the output surface S4. Thereafter, the light B5 is reflected by the reflective surface S5 so as to exit the light guide 40 through the output surface S3 and travel toward the reading position A1. In this manner, in the light guide 40, the light B5, which is a portion of the light that has entered the light guide 40 from the focal point P3 on the end face S1, travels directly toward the arched surface S6 and thereafter travels toward the reading position A1. Moreover, in the light guide 40, for the same reason, the light B6, which is a portion of the light that has entered the light guide 40 from the focal point P1 on the end face S2, travels directly toward the arched surface S7, and thereafter travels toward the reading position A1. Thus, the light guide 40 makes it possible to enhance light use efficiency.

Furthermore, the light source 50a emits light that enters the light guide 40 via the end face S1, and the light source 50b emits light that enters the light guide 40 via the end face S2. Accordingly, light enters the light guide 40 from both ends of the y-axis direction. Thus, illuminance distribution of the light guide 40 approaches uniformity for the y-axis direction.

Furthermore, the light guide 40 is provided with one reflective surface S5 for two output surfaces S3 and S4. Thus, the light guide 40 can be produced at a lower cost than a light guide provided with a reflective surface for each of the output surfaces S3 and S4.

Simulations

To further clarify effects achieved by the light guide 40, the present inventors carried out computer simulations to be described below. The light guide 40 configured as shown in FIG. 3 was used as a model. In FIG. 3, the direction that is parallel to the reflective surface S5 is defined as X-axis. Moreover, the direction that is perpendicular to the X-axis is defined as Y-axis.

In these simulations, the following four lighting patterns were analyzed for illuminance distribution. In the first lighting pattern, the light sources 50a and 50b were lit up. The first lighting pattern corresponds to the lighting pattern of the illuminating device 27 according to the present embodiment. In the second lighting pattern, only the light source 50a was lit up. In the third lighting pattern, only the light source 50b was lit up. In the fourth lighting pattern, a light source 50' was lit up. The light source 50', when viewed in plan from the negative y-axis direction, is positioned at the center of the light guide 40, as shown in FIG. 3, and the light source 50' emits light with twice the illuminance compared to the light sources 50a and 50b.

Figure 7:
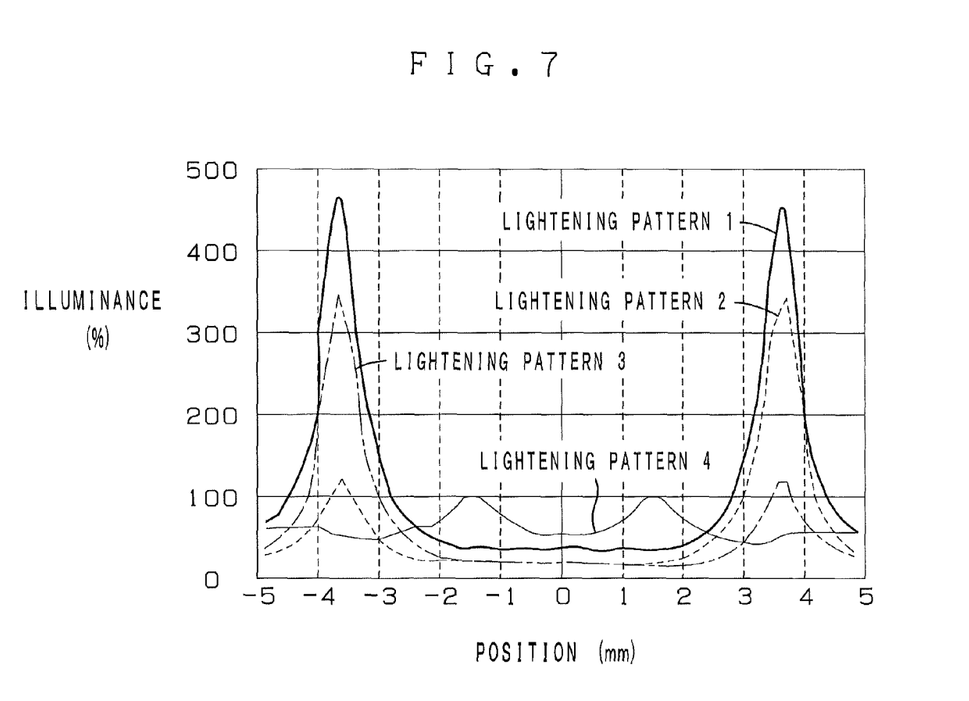
FIG. 7 is a graph showing simulation results.

FIG. 7 is a graph showing simulation results. The vertical axis represents the illuminance, and the horizontal axis represents the position on the X-axis. The origin of the X-axis corresponds to the center of the light guide 40 in the X-axis direction (i.e., the connection between the output surface S3 and the output surface S4). Moreover, peaks of the illuminance distribution for the fourth lighting pattern are considered to be at 100% illuminance.

In FIG. 7, the fourth lighting pattern (where the light source 50' was lit up) has relatively small peaks at the 1.5 mm mark and the −1.5 mm mark on the X-axis. On the other hand, the second lighting pattern (where only the light source 50a was lit up) has a large peak at the 3.5 mm mark on the X-axis. The peak of the second lighting pattern at the 3.5 mm mark on the X-axis is significantly higher than the peak of the fourth lighting pattern at the 1.5 mm mark on the X-axis. This demonstrates that the light emitted by the light source 50a was efficiently utilized. Moreover, the third lighting pattern (where only the light source 50b was lit up) has a large peak at the −3.5 mm mark on the X-axis. The peak of the third lighting pattern at the −3.5 mm mark on the X-axis is significantly higher than the peak of the fourth lighting pattern at the −1.5 mm mark on the X-axis. This demonstrates that the light emitted by the light source 50b was efficiently utilized. Moreover, the illuminance distribution for the first lighting pattern corresponds to a light pattern added the illuminance distribution for the second lighting pattern and the illuminance distribution for the third lighting pattern. Therefore, the first lighting pattern has large peaks at the 3.5 mm mark and the −3.5 mm mark on the X-axis. In FIG. 7, the first lighting pattern has about four times the illuminance compared to the fourth lighting pattern. For the first lighting pattern, the light that corresponds to the 3.5 mm mark on the X-axis travels directly toward the reading position A1, and the light that corresponds to the −3.5 mm mark on the X-axis is reflected by the mirror 28 toward the reading position A1. As a result, the reading position A1 is illuminated with more light.

Modifications

Figure 8:
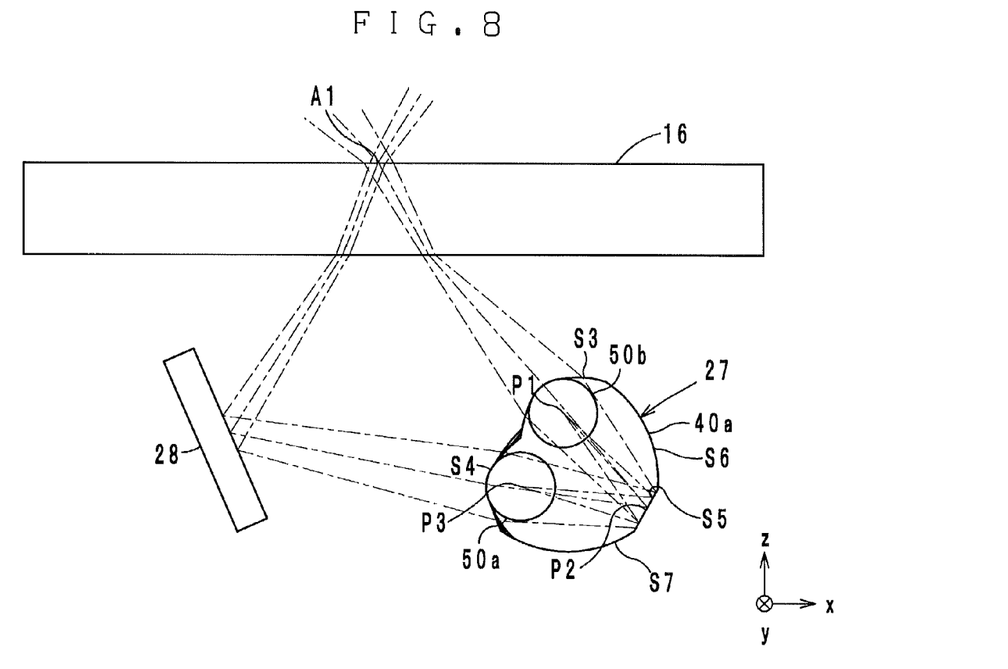
FIG. 8 is a diagram illustrating an illuminating device including a light guide according to a modification as viewed in plan from the negative y-axis direction.
Figure 9A:
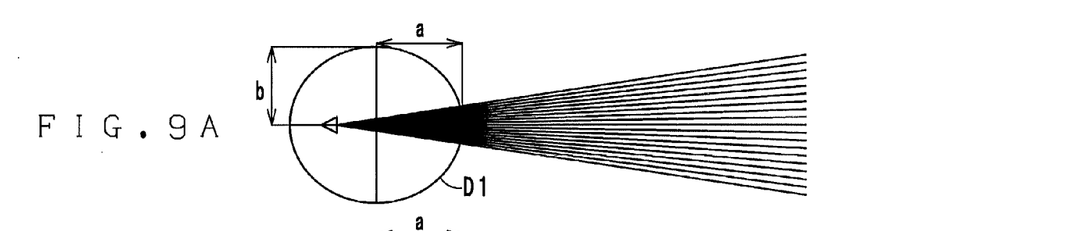
FIGS. 9A, 9B, and 9C are diagrams illustrating convergence of light by elliptical lenses different in major-axis length and minor-axis length.
Figure 9B:
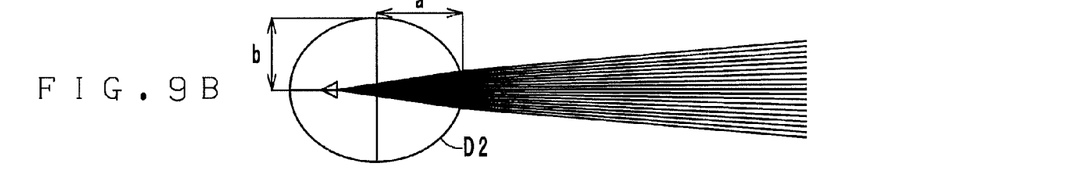
Figure 9C:
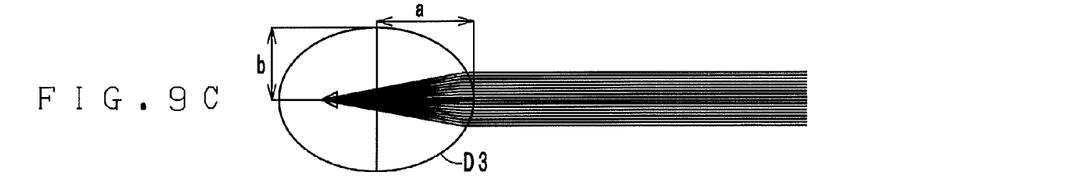

A light guide 40a according to a modification will be described below with reference to the drawings. FIG. 8 is a diagram illustrating an illuminating device 27 including the light guide 40a according to the modification as viewed in plan from the negative y-axis direction. FIGS. 9A, 9B, and 9C are diagrams illustrating convergence of light by elliptical lenses different in major-axis length a and minor-axis length b.

The light guide 40a differs from the light guide 40 in terms of the shape of the output surface S4. The ellipses C1 and C2 of the light guide 40 have the same shape. On the other hand, the ellipses C1 and C2 of the light guide 40a have different shapes. More specifically, in the light guide 40a, the distance between the focal points P1 and P2 is longer than the distance between the focal points P2 and P3. As a result, the output surface S4, which partially constitutes the ellipse C2, is curved more gently than the output surface S3, which partially constitutes the ellipse C1.

Here, the divergence of light from differently curved output surfaces will be studied with reference to FIGS. 9A, 9B, and 9C. Conditions for an ellipse D1 in FIG. 9A, an ellipse D2 in FIG. 9B, and an ellipse D3 in FIG. 9C are as described below.

In the following, a is the length of the major axis, b is the length of the minor axis, and $\sqrt{(a^2-b^2)}$ is the distance from the intersection of the major axis and the minor axis to the focal point:

Ellipse D1: a=2.8, b=2.6, $\sqrt{(a^2-b^2)}$=1.0
Ellipse D2: a=2.8, b=2.35, $\sqrt{(a^2-b^2)}$=1.5
Ellipse D3: a=3.13, b=2.35, $\sqrt{(a^2-b^2)}$=2.1

The ellipse D1 has a longer minor-axis length b than the ellipse D2. Therefore, the output surface of the ellipse D1 is more gently curved than the output surface of the ellipse D2, so that the light that has exited from the focal position in the ellipse D1 diverges more than the light that has exited from the focal position in the ellipse D2. The ellipse D3 has a longer major-axis length a than the ellipse D2. Therefore, the output surface of the ellipse D2 is more gently curved than the output surface of the ellipse D3, so that the light that has exited from the focal position in the ellipse D2 diverges more than the light that has exited from the focal position in the ellipse D3. From the above study, the light that has exited through the output surface S4 with the relatively gentle curve diverges more than the light that has exited through the output surface S3 with the relatively steep curve.

Here, the optical path that is bent by the mirror 28 to reach the reading position A1 as shown in FIG. 8 is longer than the optical path that reaches the reading position A1 without being bent by the mirror 28.

Therefore, in the image reading apparatus 10 using the light guide 40a, the light that has exited through the output surface S3 travels directly toward the reading position A1. On the other hand, since the elliptical output surface S4 is gently curved, the light that has exited through the output surface S4 is not focused in front of the mirror 28 unlike in the light guide 40, and its focal point is further distanced from the output surface S4. That is, the focal point is closer to the reading position A1. Thus, both the light that has exited through the output surface S3 and the light that has exited through the output surface S4 are efficiently converged at the reading position A1.

Other Embodiments

The present invention is not limited to the light guides 40 and 40a and the illuminating device 27, and variations can be made within the spirit of the invention.

In the illuminating device 27, the light source 50a faces the end face S1, and the light source 50b faces the end face S2, but both the light sources 50a and 50b may face the end face S1, or both may face the end face S2. Moreover, the light source 50a may face the end face S2, and the light source 50b may face the end face S1.

Although the present invention has been described in connection with the preferred embodiment above, it is to be noted that various changes and modifications are possible to those who are skilled in the art. Such changes and modifications are to be understood as being within the scope of the invention.

What is claimed is:

1. A light guide having a bar-like shape that extends in a predetermined direction, comprising:
a reflective surface that reflects light inside the light guide within the light guide;
a first output surface that causes light inside the light guide to exit the light guide, wherein the first output surface, when viewed in plan from the predetermined direction, constitutes a first arc of an ellipse that has a first focal point, along with a second focal point located on the reflective surface, and the first arc is closer to the first focal point than to the second focal point; and
a second output surface that causes light inside the light guide to exit the light guide, wherein the second output surface, when viewed in plan from the predetermined direction, constitutes a second arc of an ellipse that has a third focal point, along with a fourth focal point coinciding with the second focal point, and the second arc is closer to the third focal point than to the fourth focal point.

2. The light guide according to claim 1, further comprising:
a first arched surface that connects the first output surface and the reflective surface, wherein the first arched surface, when viewed in plan from the predetermined direction, partially constitutes a circle with the third focal point at its center; and
a second arched surface that connects the second output surface and the reflective surface, wherein the second arched surface, when viewed in plan from the predetermined direction, partially constitutes a circle with the first focal point at its center.

3. The light guide according to claim 1, wherein a distance between the first focal point and the second focal point is longer than a distance between the third focal point and the fourth focal point.

4. The light guide according to claim 1, wherein the light guide has a first end face and a second end face at opposite ends in the predetermined direction.

5. The light guide according to claim 4, wherein,
a portion of light that enters the light guide from the third focal point on the first end face or the second end face is reflected by the reflective surface, and thereafter exits through the first output surface, and
a portion of light that enters the light guide from the first focal point on the first end face or the second end face is reflected by the reflective surface, and thereafter exits through the second output surface.

6. An illuminating device comprising:
the light guide of claim 4;
a first light source that is configured so as to emit light so as to enter the light guide from the third focal point on the first end face or the third focal point on the second end face; and
a second light source that is configured so as to emit light so as to enter the light guide from the first focal point on the first end face or the first focal point on the second end face.

7. The illuminating device according to claim 6, wherein,
the light that has exited through the second output surface is reflected by a mirror toward a reading position,
a distance between the first focal point and the second focal point is longer than a distance between the third focal point and the fourth focal point, and
the light that has exited through the first output surface travels toward the reading position.

8. An image reading apparatus comprising an illuminating device of claim 6.

9. An image reading apparatus comprising an illuminating device of claim 7.

10. The light guide according to claim 1, wherein the first arc of the ellipse and the second arc of the ellipse are convex outward.

11. The illuminating device according to claim 6, wherein:
the first light source is located at a position to overlap the third focal point in the predetermined direction; and
the second light source is located at a position to overlap the first focal point in the predetermined direction.

12. The illuminating device according to claim 6, wherein:
a portion of the light that enters the light guide from the third focal point on the first end face or the second end face is reflected by the reflective surface, and thereafter exits through the first output surface, and
a portion of the light that enters the light guide from the first focal point on the first end face or the second end face is reflected by the reflective surface, and thereafter exits through the second output surface.

* * * * *